H. A. CURRENT.
Sawing-Machines.

No. 136,216.    Patented Feb. 25, 1873.

Witnesses:
John Becker
C. Sedgwick

Inventor:
H. A. Current
per [signature]
Attorneys.

UNITED STATES PATENT OFFICE.

HUGH A. CURRENT, OF CLARKSVILLE, TENNESSEE.

IMPROVEMENT IN SAWING-MACHINES.

Specification forming part of Letters Patent No. 136,216, dated February 25, 1873.

*To all whom it may concern:*

Be it known that I, HUGH A. CURRENT, of Clarksville, in the county of Montgomery and State of Tennessee, have invented a new and Improved Sawing-Machine, of which the following is a specification:

My invention consists of two or more circular saws, suitably arranged on the top of a table or bench for sawing wood sticks into three pieces, with endless-belt carriers on which the pieces of cord-wood to be sawed are laid to be carried along, side by side, to the saws, and clamps on some of the carriers—say those which run between the saws—so contrived that, as they rise up over the roller to move along the top of the table toward the saws, they will swing down on the pieces of wood placed in front of them and hold the said pieces on the carrier, and when they pass down over the roller at the other end they will release the sticks and let them fall onto a receiver below, which may be an endless carrier, for carrying the sawed pieces alongside of the pile, or to a car in which to load them for carrying away.

Figure 1:
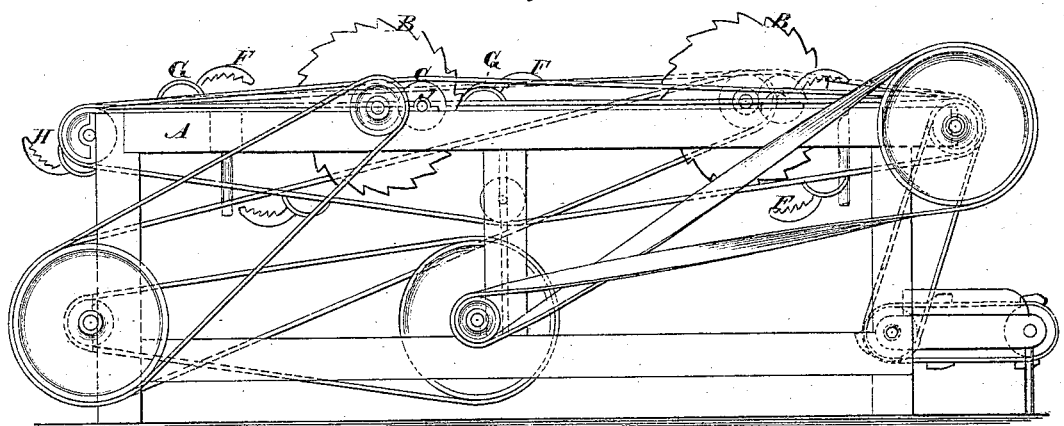
Figure 2:
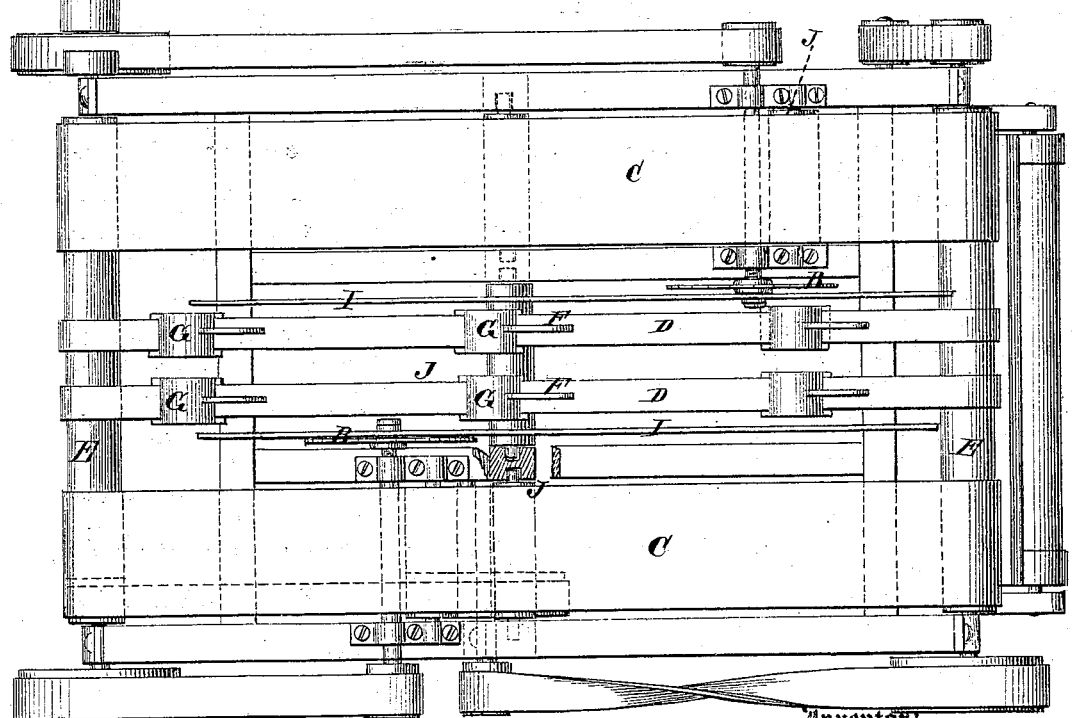

Figure 1 is a side elevation of my improved sawing-machine, and Fig. 2 is a plan view.

Similar letters of reference indicate corresponding parts.

A represents the sawing table or frame, which, for a machine to cut cord-wood into stove wood, will be about four or five feet wide and twice as long, or thereabout. B represents the saws, which are so placed in respect of the transverse direction of the machine as to divide the pieces of wood in about three pieces, and one is placed behind the other for dividing the labor. C represents a wide endless carrier-belt of leather or other approved substance, placed outside of each saw, and D represents a couple of narrower carrier-belts, placed between the saws. These belts all work over the rollers E, at the ends of the frame. The belts D carry a number of long curved clamp-fingers, F, which are mounted on the curved plates G, so shaped that they will pass over the rollers readily. The fingers project forward and are drawn down toward the belts when they are passing between the rollers, so as to clamp the sticks of wood and hold them firmly; but as they come up over the rollers from below they project upward, as represented at H, so as to allow the wood to be placed immediately in front of them so they will come down on and clamp it fast. I represents rails or ways alongside of the belts D, whereon the wood pieces are moved to the saws and from them. Intermediate supporting-rollers J will be employed, as required, to support the belts. The saws are arranged to be adjusted on the mandrels so they can be shifted to saw the pieces in different lengths.

The usual or any approved arrangement of pulleys and belts for operating the saws and carriers will be employed, as represented in the drawing, but which need not be described.

Having thus described my invention, I claim as new and desire to secure by Letters Patent—

The arrangement of saws B B, broad carrier C, narrow carriers D having clamp-fingers F on plates G, and the rails I, as and for the purpose described.

HUGH ANDREW CURRENT.

Witnesses:
R. W. HUMPHREYS,
F. F. FOX.